United States Patent
Wei et al.

(10) Patent No.: US 7,203,410 B2
(45) Date of Patent: Apr. 10, 2007

(54) METHOD AND APPARATUS FOR ATTACHING AN OPTICAL FIBER TO A FIBER ARRAY SUBSTRATE

(75) Inventors: Li-ding Wei, New Territories (HK); Hue-gung Wang, New Territories (HK); Takeshi Nakada, Kowloon (HK)

(73) Assignee: SAE Magnetics (H.K.) Ltd., Shatin, N.T. (HK)

( * ) Notice: Subject to any disclaimer, the term of this patent is extended or adjusted under 35 U.S.C. 154(b) by 147 days.

(21) Appl. No.: 10/097,812

(22) Filed: Mar. 13, 2002

(65) Prior Publication Data
US 2003/0174997 A1    Sep. 18, 2003

(51) Int. Cl.
*G02B 6/00* (2006.01)
*G02B 6/36* (2006.01)

(52) U.S. Cl. .................. 385/137; 385/52; 385/80; 385/115

(58) Field of Classification Search ............ 385/80, 385/137, 41–42, 49, 71, 88, 96, 99, 147, 385/130
See application file for complete search history.

(56) References Cited

U.S. PATENT DOCUMENTS

| 5,812,720 | A | * | 9/1998 | Dannoux .................. 385/115 |
| 6,122,430 | A | * | 9/2000 | Bookbinder et al. ......... 385/137 |
| 6,220,764 | B1 | * | 4/2001 | Kato et al. .................. 385/92 |
| 6,467,972 | B2 | * | 10/2002 | Setoguchi .................. 385/88 |

* cited by examiner

*Primary Examiner*—Frank G. Font
*Assistant Examiner*—Michael P. Mooney
(74) *Attorney, Agent, or Firm*—Kenyon & Kenyon LLP

(57) ABSTRACT

An improved system and method for attaching an optical fiber to a fiber array substrate involving adhesive-bonding an optical fiber's cladding directly to the substrate is disclosed.

15 Claims, 3 Drawing Sheets

METHOD AND APPARATUS FOR ATTACHING AN OPTICAL FIBER TO A FIBER ARRAY SUBSTRATE

BACKGROUND INFORMATION

The present invention relates to communication line connection. More specifically, the present invention relates to an improved system and method for attaching a strand of optical fiber to a fiber array substrate.

Several methods exist in the art for attaching optical fiber(s) to a fiber array unit, wherein optical signals are passed to devices such as a waveguide (Array Waveguide Gratings; AWG), planar lightwave circuit (PLC), or variable optical attenuator (VOA), for example, to be channeled to other optical fiber(s) or to be routed to light source(s) and/or light detecting device(s), such as light emitting diode(s) (LED) and photodiode(s), respectively. FIG. 1 illustrates a system for securing an optical fiber 108 to a fiber array substrate 104 as known in the art. The fiber 108 includes a thin glass center core 102 through which the light travels. Also, the fiber 108 contains a cladding 105, which is an optical material surrounding the core 102 to reflect light back into the core 102 (providing the total internal reflection necessary for fiber optic communication). Lastly, an optical fiber typically has a jacket 107 (or buffer coating), which is a plastic coating that protects the fiber from damage and moisture.

Typically, in coupling an optical fiber 108 to a substrate 104, a portion of the fiber 108 not containing the jacket 107 (only the core 102 and cladding 105) is placed in a 'V'-shaped groove 112 in the top of a portion of the substrate 104 to hold the optical fiber in correct alignment. Next, a lid made of glass ("lid glass") 101 is secured to the substrate 104 by an adhesive, such as ultraviolet-cured (UV) epoxy. Next, a portion of the optical fiber 108 covered by the jacket 107 (enclosing cladding 105 and core 102) is secured to the substrate by an adhesive 106, such as UV epoxy.

FIG. 2 illustrates one problem associated with this method of securing an optical cable 108 to a substrate 104. A susceptibility to coupling failure exists under physical loading of the optical fiber 208. The jacket 207, which is typically plastic is capable of deformation under stress, such as tensile force 210, is applied to the optical fiber 208. This jacket deformation causes the critical point of coupling to be between the jacket 207 and the cladding 212, where slippage is very likely. Slippage between cladding 212 and jacket 207 can greatly reduce the strength of the coupling between the optical cable 208 and the substrate 214. It is difficult to increase the clamping force upon the optical fiber 208 between the substrate 214 and lid glass 216 without damaging the fiber 208.

It is therefore desirable to have an improved system and method for attaching an optical fiber to a fiber array substrate, which avoids the aforementioned problems, as well as providing other advantages over the prior art.

DETAILED DESCRIPTION

Figure 1:
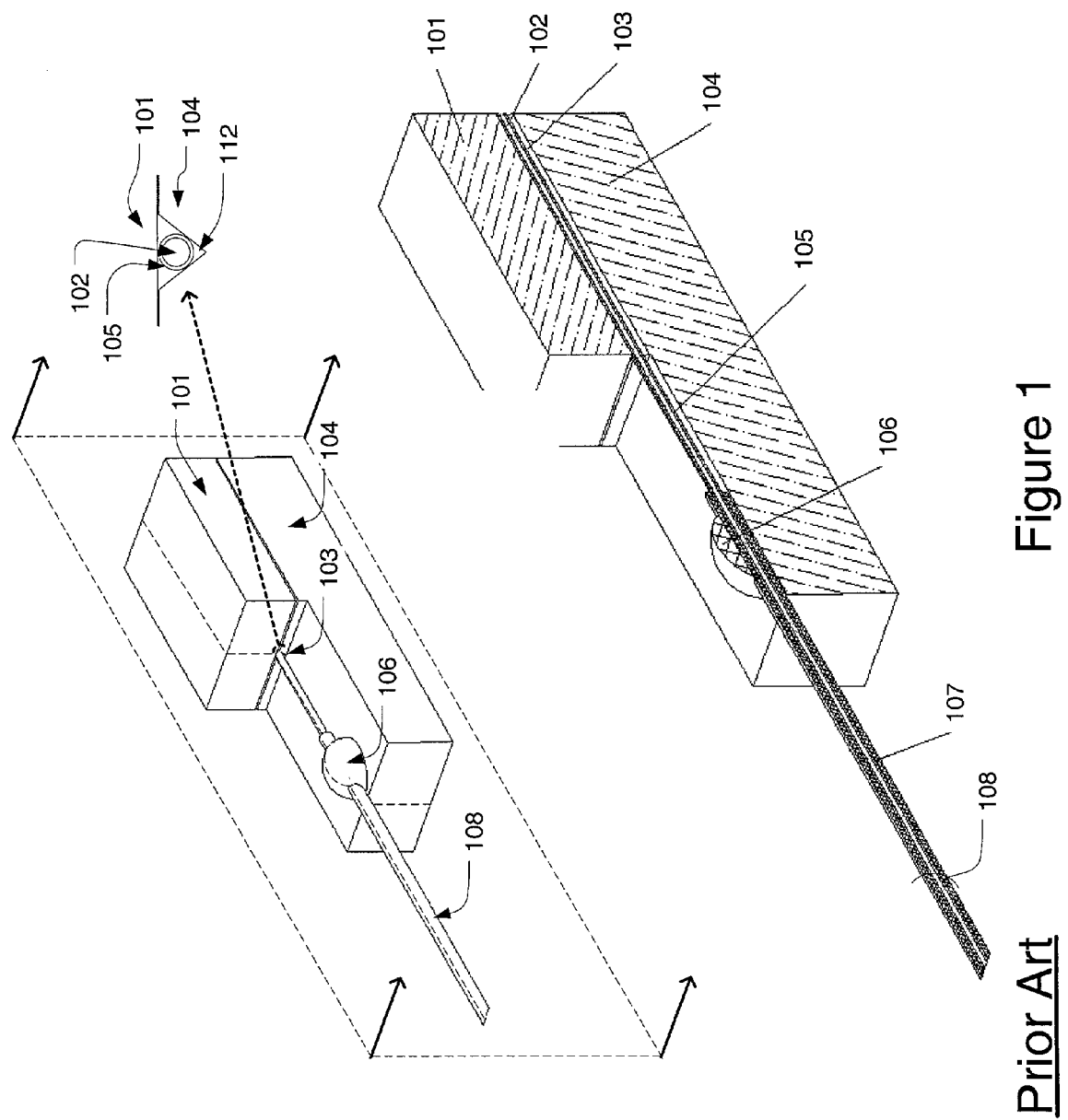
FIG. 1 illustrates a system for securing an optical fiber to a fiber array substrate as known in the art.
Figure 2:
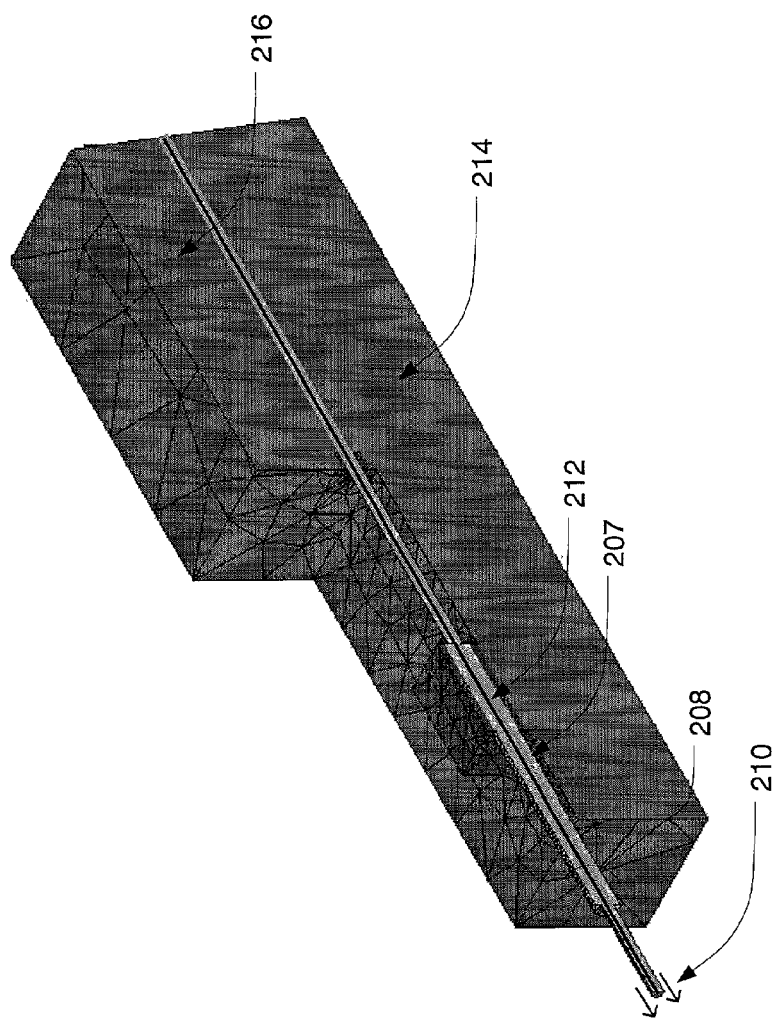
FIG. 2 illustrates one problem associated with securing an optical cable to a substrate by methods known in the art.
Figure 3:
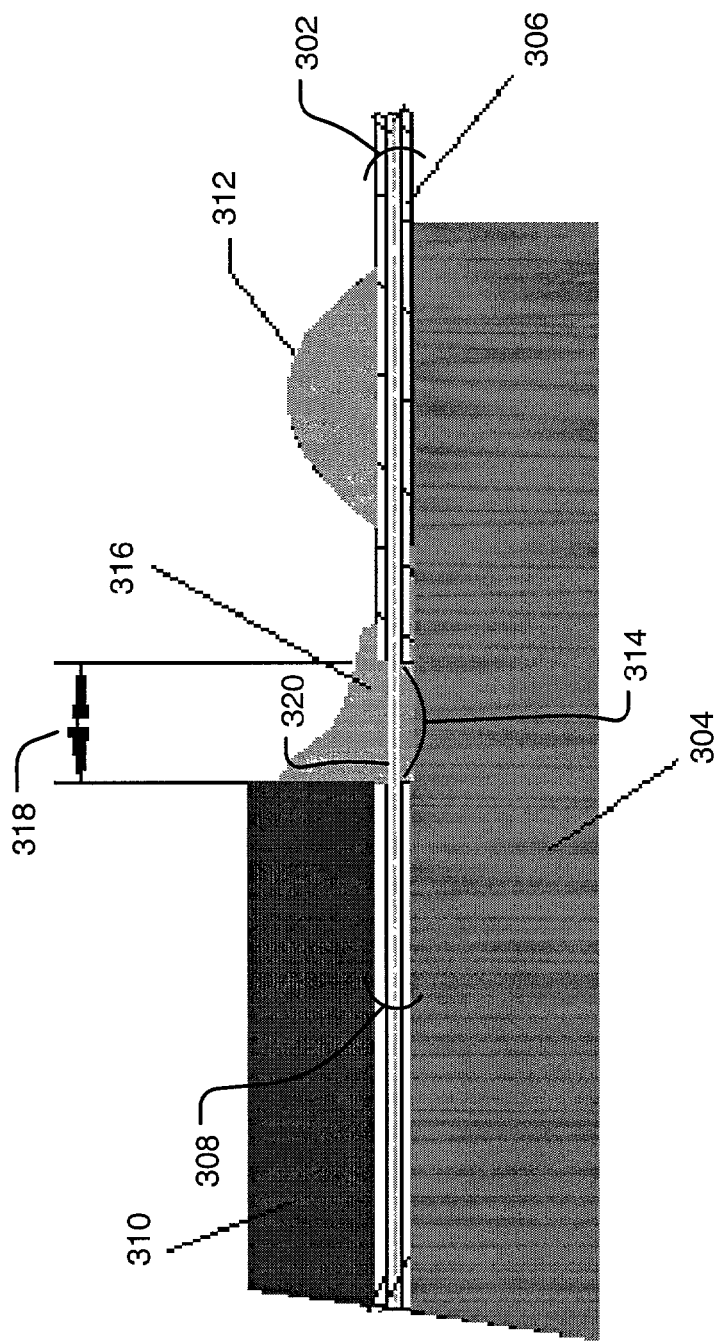
FIG. 3 illustrates an optical fiber coupled to a fiber array substrate under principles of the present invention.

FIG. 3 illustrates an optical fiber 302 coupled to a fiber array substrate 304 under principles of the present invention. In one embodiment of the present invention, a portion of the fiber 302 not containing the jacket 306 is placed in the 'V'-shaped groove 308 in the substrate 304 to hold the optical fiber 302 in correct alignment. Lid glass 310 is secured to the substrate 304 by an adhesive, such as UV epoxy. Also, the portion of the optical fiber covered by the jacket 306 is secured to the substrate by an adhesive 312, such as UV epoxy.

In one embodiment of the invention, the optical fiber 302 is further secured to the substrate 304 by an adhesive 316, such as UV epoxy, at a jacketless portion of the fiber 314. In an embodiment, the adhesive 316 bonds at least 0.3 millimeters (length) 318 of cladding 320 to the substrate 304. The addition of the cladding-to-substrate bonding greatly improves the overall coupling strength between the fiber 306 and the substrate 304.

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. A system to couple a fiber element to a substrate element comprising:
    a substrate element;
    a fiber element coupled to said substrate element, said fiber element including at least a jacket element radially enclosing a portion of a cladding element;
    an adhesive material coupling said substrate element to said fiber element by bonding the jacket element to the substrate element and bonding an unenclosed portion of the cladding element to the substrate element; and
    a flat lid element attached to the substrate element to couple the fiber element to the substrate element by compressing substantially all of the unenclosed portion of cladding between the flat lid element and the substrate element;
    wherein the flat lid element is lid glass.

2. The system of claim 1, wherein the fiber element is a strand of optical fiber.

3. The system of claim 1, wherein the adhesive material is epoxy.

4. The system of claim 1, wherein the adhesive material is ultraviolet light-cured (UV) epoxy.

5. The system of claim 1, wherein the unenclosed cladding is aligned by a 'V'-shaped groove in the substrate element.

6. A system to couple a fiber element to a substrate element comprising:
    a substrate element;
    a fiber element including at least a jacket element radially enclosing a portion of a cladding element; an adhesive material coupling said fiber element to said substrate element by bonding an unenclosed portion of the cladding element to the substrate element; and
    a flat lid element attached to the substrate element to couple the fiber element to the substrate element by compressing substantially all of the unenclosed portion of cladding between the flat lid element and the substrate element;
    wherein the flat lid element is lid glass.

7. The system of claim 6, wherein the fiber element is a strand of optical fiber.

8. The system of claim 6, wherein the adhesive material is epoxy.

9. The system of claim 6, wherein the adhesive material is ultraviolet light-cured (UV) epoxy.

10. The system of claim 6, wherein the unenclosed cladding is aligned by a 'V'-shaped groove in the substrate element.

11. A method to couple a fiber element to a substrate element comprising:
   providing a substrate element and a fiber element including at least a jacket element radially enclosing a portion of a cladding element;
   coupling said fiber element to said substrate element by an adhesive material bonding the jacket element to the substrate element and bonding an unenclosed portion of the cladding element to the substrate element;
   attaching a flat lid element to the substrate element; and
   coupling the fiber element to the substrate element by compressing substantially all of the unenclosed portion of cladding between the flat lid element and the substrate element;
   wherein the flat lid element is lid glass.

12. The method of claim 11, wherein the fiber element is a strand of optical fiber.

13. The method of claim 11, wherein the adhesive material is epoxy.

14. The method of claim 11, wherein the adhesive material is ultraviolet light-cured (UV) epoxy.

15. The method of claim 11, wherein the unenclosed cladding is aligned by a 'V'-shaped groove in the substrate element.

* * * * *